July 23, 1968     L. E. GILBREATH     3,393,845
CAR TRUNK LID LUGGAGE BAG
Filed June 27, 1967
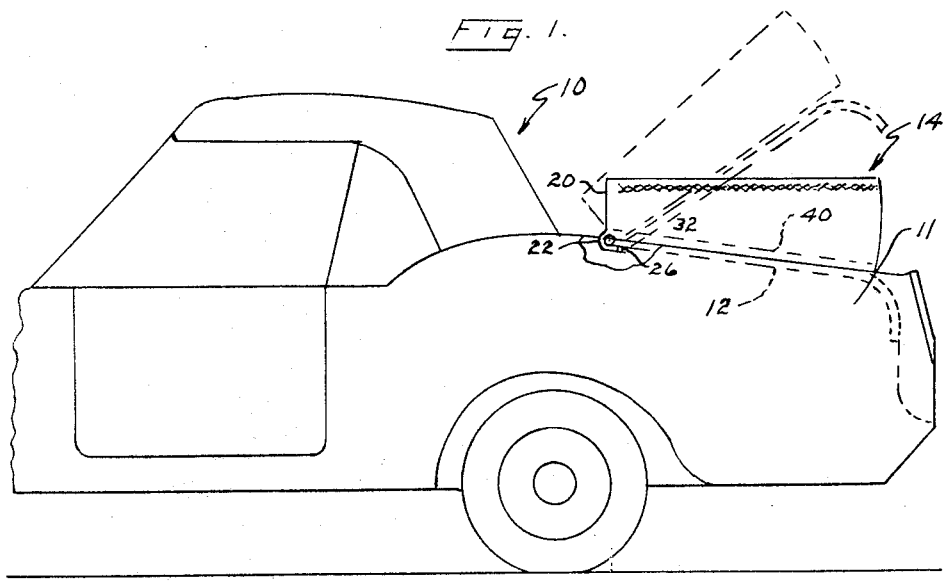
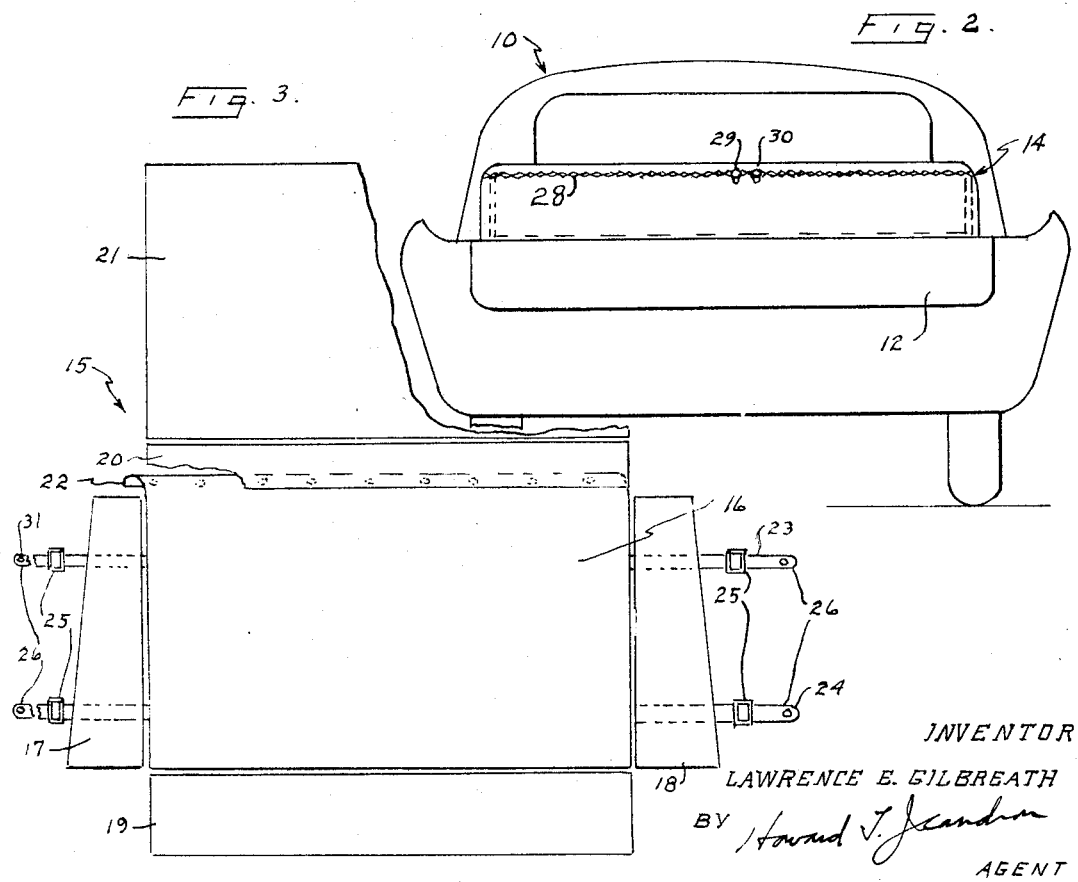
INVENTOR
LAWRENCE E. GILBREATH
BY Howard J. Jeandon
AGENT 3,393,845
CAR TRUNK LID LUGGAGE BAG
Lawrence E. Gilbreath, 16 Avenue C,
West Keansburg, N.J. 07734
Filed June 27, 1967, Ser. No. 649,228
1 Claim. (Cl. 224—29)

ABSTRACT OF THE DISCLOSURE

A luggage carrying bag to rest upon the trunk compartment of an automobile having a pivotally opening trunk compartment in which said bag is collapsible when not in use and is attached only to the lid of said trunk compartment to allow said lid to be opened or closed with said bag attached.

---

This invention relates to luggage carriers for cars and more particularly to a collapsible bag that may be affixed to the lid of the trunk compartment without interferring with the use of the trunk compartment.

Bags have been used with automobiles in the past such as the saddle bags that were hung across the hood of a car resting in the fender wells. These bags were easily mounted or removed as desired and were generally collapsible and easily stored when not in use. However with the changes in design most autos do not have fender wells and the baggage is generally strapped on in back in most any fashion. Although baggage racks are quite common in use, generally on the roof of hardtop models, there are a few such racks that may be mounted over the trunk compartment. This is not good practice as the trunk is then out of use as long as the rack is used, also the racks are not collapsible and cannot be stowed away in the trunk.

It is an object of this invention to provide a luggage bag that is completely collapsible when not in use so that it may be stored in a minimum of space.

A still further object of this invention is to provide a luggage bag for a car that is soft but durable and water repellant and will not mar the surface of the car on which it is mounted.

Other objects of this invention shall be apparent by reference to the accompanying detailed description and the drawings in which—

FIG. 1 is a side elevational view of a portion of a car showing the bag as mounted upon the trunk lid, FIG. 2 is a rear elevational view of the car and bag, and FIG. 3 is an exploded plan view of the bag.

Referring to the drawings and particularly FIGS. 1 and 2, there is indicated a resemblance of a car 10 in which there is a baggage compartment 11 in the rear of the car. With every such baggage compartment, there is provided a trunk lid 12 to cover the baggage compartment 11. This invention is primarily concerned with a luggage bag 14 to be mounted directly to the lid 12 so that the trunk lid 12 may be operated normally as shown in FIG. 1 with the bag 14 resting upon the lid in the closed position or with the bag affixed to the lid when the lid is opened as shown in dotted lines. The bag 14 may be comprised of any collapsible material preferably of a durable material and of an impervious material since the bag will be in the open and must withstand the elements during its use. Materials such as the army duck have been used and a flexible vinyl with a cloth backing is also appropriate for this bag. The bag is entirely collapsible to permit being rolled up and stowed away when not in use. When the bag is to be used, it is laid out flat as illustrated in FIG. 3, the bag being comprised of a sheet 15 of the desired material roughly shaped to the trunk lid of a car which is generally rectangular in form. The material may be shaped in a single piece or in a plurality of pieces to form a bottom sheet 16, two sides 17 and 18, a front 19 and back 20 and a top 21. Along the back of the bag there is provided a flap 22 and a plurality of snap fasteners are inserted in flap 22. On the sides 17 and 18 there are provided a pair of straps 23-24. Straps 23-24 may be adjustable by adjustable buckles 25 and straps 23-24 at the end are provided with a snap fastener 26. The bag 14 may or may not be provided with stiffening panels that may be inserted within the bag along the back, both sides and the front of the bag simply to retain the bag in an open form where it is not filled with luggage and it is preferable to retain a shape. The top 21 of the bag is affixed along the rear top edge to the back. A zipper 28 is mounted from one side of the back 20 around the complete top 21 to the other side of the back 20. The opposite side of the zipper is mounted to the upper periphery of the side wall 17 extending from back 20 across the front 19 of the bag 14 and back side 18 to the back 20. To close the two sides of the zipper 28, there are provided two slides 29-30. The slides 29-30 in the position illustrated in FIG. 2, show the zipper completely closed thus closing the bag completely. When the slide 29 is moved to the fully open position, FIG. 3, it abuts with the back 20, likewise the slide 30 moved to the fully open position will abut with the back 20. Thus the complete top 21 may be rolled or thrown back to open the bag 14. It is also to be noted that with this type of slide, either slide 29 or 30 may be moved partially to open the bag partially for stowing or removing articles. The trunk lid 12 must be prepared for the mounting of bag 14 by means of the snap fasteners 26 shown in FIG. 3, that is, in FIG. 3 only one part of the snap fastener, namely the socket end 31. The protruding or pedestal end 32 of the snap fastener must be affixed to the trunk lid. The manner of determining the position of the protruding end 32 is to position the bag upon the trunk lid with the trunk lid open so that the flap 22 may be wrapped around the back edge of the trunk lid and where the socket end of the snap fasteners are already positioned in the cloth or material, a mark may be made on the under surface of the trunk lid. At each of these marks, the other half of the snap fastener, the pedestal end, must be permanently mounted in the lid. Likewise with the bag stretched out upon the trunk lid, the straps 23 and 24 may be wrapped around the edge of the lid and brought in on the inner surface and where the socket end of the snap fastener meets the under surface of the hood, a mark may be made so that the other portion of the snap fastener, the pedestal end, may be permanently attached to this under surface. With the pedestal end of the snap fasteners so mounted in the under surface of the trunk lid, the bag 14 may be quickly and easily mounted upon the exterior surface of the trunk lid as shown in FIG. 1. It is to be noted that, with the adjustable buckles 25, the straps 23-24 may be easily mounted and they may be taken up by the buckles 25 to insure a tight fit. Likewise with this adjustment of buckles 25, the bag is adaptable to other wider trunk lids.

It is to be noted that the bag, when mounted to the trunk lid, takes into account the slant of the rear deck of the car and the portion of the bag adjacent the forward end of the car is slightly smaller than the portion of the bag adjacent the rear of the car thus taking advantage of all the space that can be used without blocking the view of the driver through the rear window for his rear view mirror.

In a further embodiment the bag 14 is provided with a felt pad 40 inside the bag simply as a cushioning, absorbing layer to prevent marring the surface of the trunk lid, the bag itself being provided of a fairly soft material, will not mar the painted surface of the trunk lid out in a further embodiment, the mounting surface of the bag may also be treated with a felt pad where desired.

Although the trunk lid luggage bag has been described as a particular configuration, the size of the bag may vary, that is, if it is designed for a small compact car, it will be of the smaller type while if it is designed for the large convertible car, it will be of the larger type and although it is shown rectangular in form, if the car, such as some of the foreign sport cars, are provided with a different shaped trunk lid, the bag may be shaped in manufacture to conform to that trunk lid. And although the bag is shown of a particular size or thickness for a modest luggage carrier, it may be doubled or greatly increased if blockage of the rear view is not a guide principal. Other changes in material for decoration may be made and any variation in the mounting means, that is, buckles or the like instead of fasteners may be utilized without departing from the spirit of this invention and this invention shall be limited only by the appended claim.

What is claimed is:

1. The combination with car having a trunk compartment that is closed by a pivotally supported lid provided with a first portion of a plurality of snap fasteners and a collapsible bag provided with a second portion of a plurality of snap fasteners which interconnect with the snap fasteners of said first portion, said bag being of a flexible, water repellant material and of a form and size to fit upon the lid of the trunk compartment of the car, said bag further including strap means secured to the lid of said car and in which said bag is movable with the trunk lid of said car.

References Cited

UNITED STATES PATENTS

| 1,958,169 | 5/1934 | O'Neill | 224—42.1 |
| 2,594,319 | 4/1952 | Law | 244—29 |
| 3,153,501 | 10/1964 | Binding | 224—42.1 |

FOREIGN PATENTS

| 1,147,612 | 6/1957 | France. |

ALBERT J. MAKAY, *Primary Examiner.*